Oct. 4, 1955          H. G. JONES          2,719,390
LAP AND METHOD FOR GRINDING PLATE GLASS
Filed July 16, 1952
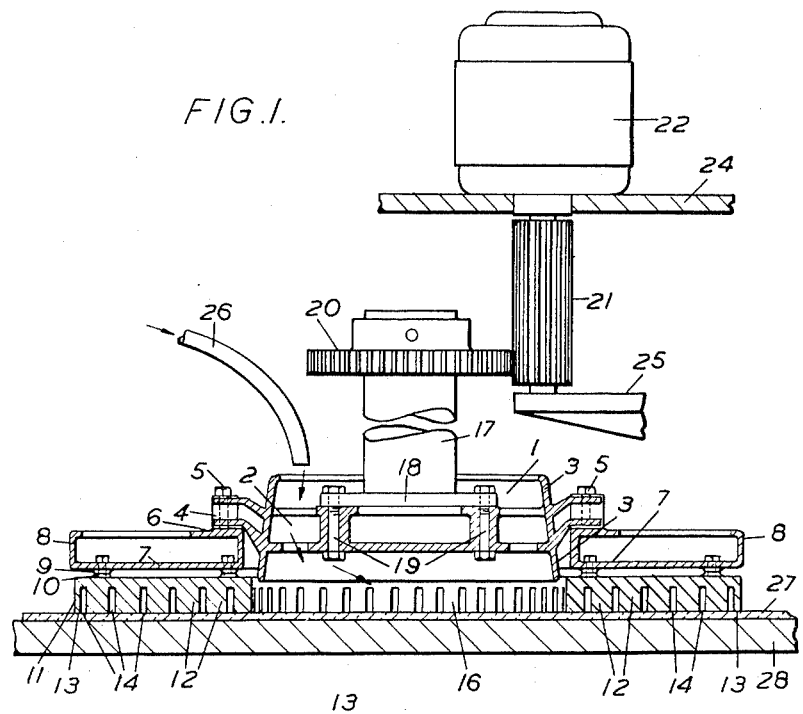
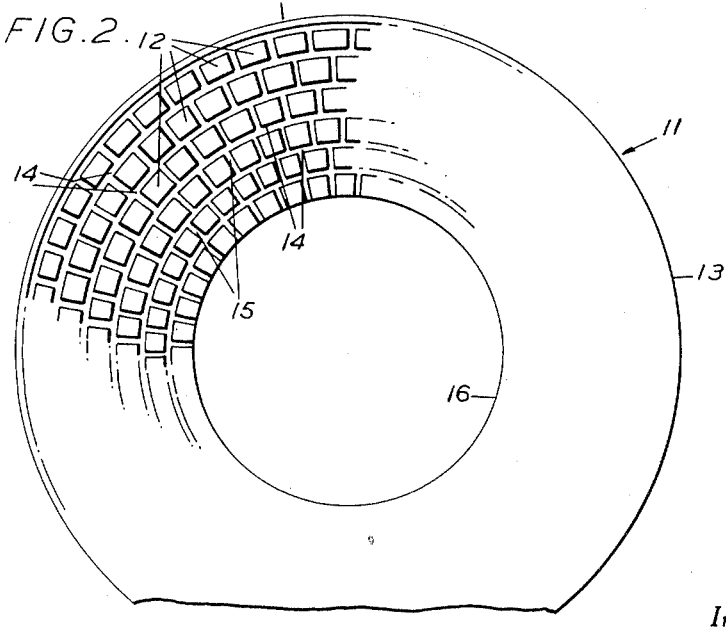
Inventor:
Harold G Jones
By
Morrison, Kennedy & Campbell
Attorneys.

United States Patent Office 2,719,390
Patented Oct. 4, 1955

2,719,390
LAP AND METHOD FOR GRINDING PLATE GLASS

Harold Goulbourne Jones, St. Helens, England, assignor to Pilkington Brothers Limited, Liverpool, England, a corporation of Great Britain Application July 16, 1952, Serial No. 299,136

Claims priority, application Great Britain July 19, 1951

15 Claims. (Cl. 51—209)

This invention relates to the grinding of plate glass.

In the manufacture of polished plate glass, the rough rolled glass is first ground on both surfaces to make the two surfaces flat and parallel to each other. This is achieved as a continuous operation by grinding the glass with a linear series (e. g. twelve) of cast iron disc-shaped grinding tools each rotating about a vertical axis and usually having a diameter of from eight to nine feet, the tools somewhat overlapping each edge of the glass.

The flat rough rolled glass is bedded on a continuous moving table under the series of grinding tools.

The operative faces of the grinding tools comprise outwardly directed channels separating grinding nogs, which channels convey loose abrasive in the form of sand particles carried in a liquid medium such as water delivered to a central aperture in the tool. The grain size of the particles is carefully graded and progressively decreases in successive grinding tools in the direction of the movement of the glass, a very fine grain size being employed in the final stages wherein "smoothing" is effected.

The object of grinding is to produce a ground surface of the finest possible texture and the result is known as a "smooth." The smooth is subsequently polished by subjecting the smooth to the effects of a plurality of felt covered rotating discs to the surface of which rouge is supplied, and under which the glass is carried by the table.

The amount of work necessary to convert the smooth to a perfect polish depends upon the amount of glass which has to be polished away in order to bring the surface level down to the bottom of the deepest "pits" existing in the smooth.

Microscopic examination of a smooth reveals a general texture of extremely fine asperities and, distributed throughout this general texture, small pits several times as deep as the fine asperities. -It follows that a great part of the work of polishing consists in removing enough material to "bottom" the pits after the general texture has already been polished.

The main object of the invention is to produce a smooth which is substantially free from pits, and thereby to achieve a great reduction in the amount of work needed for the subsequent polishing process, and a proportionate reduction in the amount of polishing machine capacity, and in the capital outlay, processing cost, and factory space represented thereby, thus producing polished plate glass in a more economical manner than by the present known methods in which the smooth is produced by the use of cast iron grinding tools.

The present invention comprises a disc shaped grinding tool of cast metal alloy for use in surfacing plate glass supported in a horizontal plane, said tool having an axial cavity, a rim and grinding nogs, the surfaces of which nogs are co-planar with the rim, said nogs being disposed between the cavity and rim and separated by distributing channels for abrasive in suspension flowed from the cavity to the surfaces of the nogs, the metal alloy of the said tool having substantially the following composition: 64% to 83% copper, 2% to 12% tin, 0% to 2½% zinc, 5% to 30% lead and 0% to 1% nickel.

Experiments have shown that a grinding tool having an operating surface cast from a lead bronze alloy containing 20% lead produces excellent results, and similar results have been obtained when the lead bronze alloy is of that type known as "gun metal," such type of alloy containing 15% of lead.

Examples of alloys used in accordance with the present invention in the manufacture of the operating surfaces of grinding tools are as follows:

Example 1

| | Percent |
|---|---|
| Copper | 74 |
| Tin | 5 |
| Lead | 20 |
| Nickel | 1 |

Example 2

| | |
|---|---|
| Copper | 80 |
| Tin | 2½ |
| Zinc | 2½ |
| Lead | 15 |

Example 3

| | |
|---|---|
| Copper | 80 |
| Tin | 10 |
| Lead | 10 |

Example 4

| | |
|---|---|
| Copper | 72 |
| Tin | 2 |
| Lead | 25 |
| Nickel | 1 |

Example 5

| | |
|---|---|
| Copper | 83 |
| Tin | 12 |
| Lead | 5 |

Example 6

| | |
|---|---|
| Copper | 64 |
| Tin | 5 |
| Lead | 30 |
| Nickel | 1 |

An examination of the examples above given will show that the ratio of the lead content to the copper tin content varies between 1 to 3 and 1 to 9.

In order that the invention may be more clearly understood, one embodiment thereof will now be described, by way of example, with reference to the accompanying diagrammatic drawings, in which Figure 1 is a central sectional elevation, showing the construction of a disc-shaped grinding tool operating on the surface of a supported sheet of plate glass, at the smoothing stage, and Figure 2 is a fragmentary underside plan view of the tool illustrated in Figure 1.

The grinding tool is of composite nature comprising a spider frame 1 having four equally spaced hollow arms 2, supporting a skirt 3 and external bosses 4 in alignment with the arms, through which bosses 4 bolts 5 are passed to an inner L-shaped flange 6 of a backing plate 7, which latter has also an outer flange 8. The backing plate is accordingly of annular form and comprises machined faces 9 against which are abutted similar faces 10 formed on the back of a grinding disc 11, the operating surface of which is formed by nogs 12, and a rim 13, the nogs being of rectangular form and constituting islands separated from one another and from the co-planar continuous rim 13 by concentric channels 14 which are intersected by outwardly directed channels 15 (see Fig. 2).

The operating surface of the grinding disc, constituted by the surface of the rim 13 and the assembly of faces on the nogs 12, surrounds a central aperture 16 above which the spider frame is co-axially disposed and into which the skirt 3 depends.

The backing plate and grinding disc are bolted together in the usual manner, and the assembly constitutes a disc-shaped grinding tool.

The tool is driven about its vertical axis by means of a main driving spindle 17 carrying a driving flange 18 secured to the spider frame by bolts 19.

In the operative position the abrasive (sand suspended in water) is flowed through a pipe indicated at 26 into the spider frame through which it falls through the skirt 3 to the glass 27, being ground by the rotating tool, and then flows outwardly through the channels 14 and 15.

In the embodiment illustrated the spider frame and backing plate are formed from cast iron in the usual manner, but the grinding disc is formed from a lead bronze allow the proportion of lead being 20% of the alloy, the nogs 12 being cast integral with the disc 11. However, the nogs 12 may be formed separately and secured by studs to the back of a cast iron disc comprising a rim 13 as will be well understood.

It will be appreciated that a disc-shaped grinding tool according to the invention may comprise nogs formed from a lead bronze alloy containing a proportion of lead which may vary within the range of 5% to 30% of the alloy.

Though the arrangement illustrated shows a grinding tool operating on rolled glass 27 carried in well known manner on continuously moving table 28, the invention is equally applicable to the manufacture of grinding tools which in use are arranged in co-axial pairs, the axes being vertical, and which operate simultaneously on both surfaces of a moving ribbon of glass. In particular, the invention is especially suitable for the production of the grinding surface of a grinding tool constructed as described and claimed in U. S. patent specification No. 2,577,937 wherein the grinding surface of the grinding tool is constituted by a plurality of nogs in the form of curved bars which are continuously curved outwardly in the intended direction of rotation of the tool.

The experiments which have been conducted with grinding tools, the operating surface of which is formed from a lead bronze in accordance with the invention, have shown that lead bronzes comprising 5% to 30% lead all show considerable advantages over cast iron grinding tools in the quality of the smooth produced. Those containing the lesser quantity of lead show the slower rate of wear, but with a relatively slow rate of wear an excellent smooth is obtained when the lead content is 15% to 20%. As the lead content increases beyond 20% the quality of the smooth becomes somewhat inferior to that achieved when lead bronze contains 20% lead, and the rate of wear is greater.

Moreover, the experiments show that a grinding tool with an operating surface constituted by a lead bronze alloy according to the invention produces a smooth which contains fewer and shallower pits than that to be found in a smooth produced by cast iron tools, and accordingly glass treated according to the invention requires correspondingly less work to bring the smooth to a perfect polish.

I claim:

1. A disc shaped grinding tool of cast metal alloy for use in surfacing plate glass supported in a horizontal plane, said tool having an axial cavity, a rim and grinding nogs, the surfaces of which nogs are co-planar with the rim, said nogs being disposed between the cavity and rim and separated by distributing channels for abrasive in suspension flowed from the cavity to the surfaces of the nogs, the metal alloy of the said tool having substantially the following composition: 64% to 83% copper, 2% to 12% tin, 0% to 2½% zinc, 5% to 30% lead and 0% to 1% nickel.

2. A disc-shaped grinding tool according to claim 1 characterised in that the operating surface is formed from the following alloy:

| | Per cent |
|---|---|
| Copper | 80 |
| Tin | 10 |
| Lead | 10 |

3. A disc-shaped grinding tool according to claim 1 characterised in that the operating surface is formed from the following alloy:

| | Per cent |
|---|---|
| Copper | 72 |
| Tin | 2 |
| Lead | 25 |
| Nickel | 1 |

4. A disc-shaped grinding tool according to claim 1 characterised in that the operating surface is formed from the following alloy:

| | Per cent |
|---|---|
| Copper | 83 |
| Tin | 12 |
| Lead | 5 |

5. A disc-shaped grinding tool according to claim 1 characterised in that the operating surface is formed from the following alloy:

| | Per cent |
|---|---|
| Copper | 64 |
| Tin | 5 |
| Lead | 30 |
| Nickel | 1 |

6. A disc-shaped grinding tool of cast metal alloy for use in surfacing plate glass supported in a horizontal plane, said tool having an axial cavity, a rim and grinding nogs, the surfaces of which nogs are co-planar with the rim, said nogs being disposed between the cavity and rim and separated by distributing channels for abrasive in suspension flowed from the cavity to the surfaces of the nogs, the metal alloy of the said tool having substantially the following composition: 74% to 80% copper, 2½% to 5% tin, 0% to 2½% zinc, 15% to 20% lead and 0% to 1% nickel.

7. A dis-shaped grinding tool according to claim 6 characterised in that the operating surface is formed from a lead bronze alloy of the following composition:

| | Per cent |
|---|---|
| Copper | 74 |
| Tin | 5 |
| Lead | 20 |
| Nickel | 1 |

8. A disc-shaped grinding tool according to claim 6 characterised in that the operating surface is formed from the following alloy:

| | Per cent |
|---|---|
| Copper | 80 |
| Tin | 2½ |
| Zinc | 2½ |
| Lead | 15 |

9. A disc-shaped grinding tool of cast metal alloy for use in surfacing plate glass supported in a horizontal plane, said tool having an axial cavity, a rim and grinding nogs, the surfaces of which nogs are co-planar with the rim, said nogs being disposed between the cavity and rim and separated by distributing channels for abrasive in suspension flowed from the cavity to the surfaces of the nogs, the metal alloy of the said tool consisting of the following elements: copper, tin, lead and nickel, wherein the ratio of the lead content to the copper tin content is between 1 to 3 and 1 to 9.

10. A disc-shaped grinding tool of cast metal alloy for use in surfacing plate glass supported in a horizontal plane, said tool having an axial cavity, a rim and grinding nogs, the surfaces of which nogs are co-planar with the rim, said nogs being disposed between the cavity and rim and separated by distributing channels for abrasive in suspension flowed from the cavity to the surfaces of the nogs, the metal alloy of the said tool consisting of the following elements: copper, tin, zinc and lead wherein the ratio of the lead content to the copper tin content is between 1 to 3 and 1 to 9.

11. A method of grinding plate glass consisting in subjecting each plane surface thereof to the grinding action of a grinding disc having an axial cavity, a rim and grinding nogs, the surfaces of which nogs are co-planar with the rim, said nogs being disposed between the cavity and rim, the nogs being separated by distributing channels through which abrasive sand particles in suspension are continually flowed from the cavity to the nogs, said grinding disc being cast in a metal alloy having substantially the following composition: 64% to 83% copper, 2% to 12% tin, 0% to 2½% zinc, 5% to 30% lead and 0% to 1% nickel.

12. A method of grinding plate glass consisting in subjecting each plane surface thereof to the grinding action of a grinding disc having an axial cavity, a rim and grinding nogs, the surfaces of which nogs are co-planar with the rim, said nogs being disposed between the cavity and rim, the nogs being separated by distributing channels through which abrasive sand particles in suspension are continually flowed from the cavity to the nogs, said grinding disc being cast in a metal alloy having substantially the following composition: 74% to 80% copper, 2½% to 5% tin, 0% to 2½% zinc, 15% to 20% lead and 0% to 1% nickel.

13. A method of grinding plate glass consisting in subjecting each plane surface thereof to the grinding action of a grinding disc having an axial cavity, a rim and grinding nogs, the surfaces of which nogs are co-planar with the rim, said nogs being disposed between the cavity and rim, the nogs being separated by distributing channels through the abrasive sand particles in suspension are continually flowed from the cavity to the nogs, said grinding disc being cast in a metal alloy consisting of the following elements: copper, tin, lead and nickel, wherein the ratio of the lead content to the copper tin content is between 1 to 3 and 1 to 9.

14. A method of grinding plate glass consisting in subjecting each plane surface thereof to the grinding action of a grinding disc having an axial cavity, a rim and grinding nogs, the surfaces of which nogs are co-planar with the rim, said nogs being disposed between the cavity and rim, the nogs being separated by distributing channels through which abrasive sand particles in suspension are continually flowed from the cavity to the nogs, said grinding disc being cast in a metal alloy consisting of the following elements: copper, tin, zinc and lead, wherein the ratio of the lead content to the copper tin content is between 1 to 3 and 1 to 9.

15. A disc-shaped grinding tool of cast metal alloy for use in surfacing plate glass supported in a horizontal plane, said tool having an axial cavity, a rim and a grinding surface constituted by a single annulus of spaced bars continuously curved outwardly in the intended direction of rotation of the tool, and distributing channels disposed between the cavity and the rim for abrasive in suspension flowed from the cavity to the grinding surfaces of the bars which are co-planar with the rim, the metal alloy of said tool having substantially the following composition: 64% to 83% copper, 2% to 12% tin, 0% to 2½% zinc, 5% to 30% lead and 0% to 1% nickel.

References Cited in the file of this patent
UNITED STATES PATENTS

| | | |
|---|---|---|
| 1,854,508 | Drake | Apr. 19, 1932 |
| 1,931,370 | Bethel | Oct. 17, 1933 |
| 2,040,054 | Lytle | May 5, 1936 |
| 2,460,991 | Brasse et al. | Feb. 8, 1949 |
| 2,554,070 | Stead | May 22, 1951 |
| 2,577,937 | Waldron | Dec. 11, 1951 |
| 2,597,182 | Rickner et al. | May 20, 1952 |